UNITED STATES PATENT OFFICE.

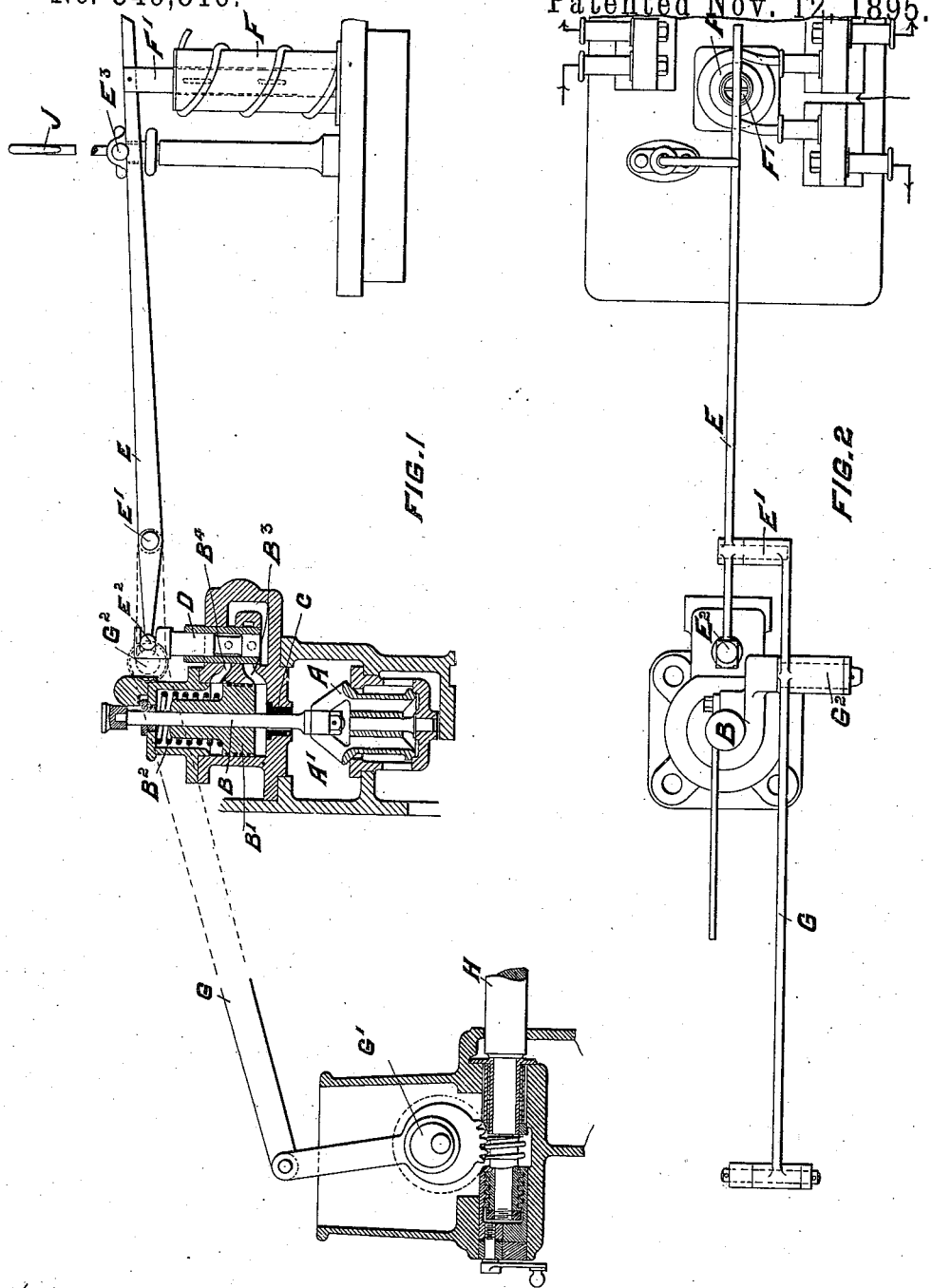

CHARLES ALGERNON PARSONS, OF NEWCASTLE-UPON-TYNE, ENGLAND.

MEANS FOR GOVERNING STEAM-TURBINES.

SPECIFICATION forming part of Letters Patent No. 549,816, dated November 12, 1895.

Application filed July 27, 1893. Serial No. 481,656. (No model.)

*To all whom it may concern:*

Be it known that I, CHARLES ALGERNON PARSONS, a citizen of Great Britain, residing at Newcastle-upon-Tyne, in the county of Durham and Kingdom of England, have invented certain new and useful Improvements in Means for Governing Steam-Turbines, in part applicable to other steam-engines; and I do hereby declare the following to be a full, clear, and exact description of the invention, such as will enable others skilled in the art to which it appertains to make and use the same.

My invention relates to the governing-valves and mechanism of steam-turbines and other steam-engines; and its principal object is to produce a steam-turbine-governing apparatus of simple construction and more effective in action than any such governor hitherto used. At the same time, part of the invention may be applied to governing and operating the cut-off valve or valves of an ordinary reciprocating steam-engine.

Described in general terms, the invention consists in a novel arrangement for actuating the admission-valve so as to secure a periodic admission of steam to the turbine or other engine, the said periodic admission being regulated as to duration of each opening or puff in such manner as to constitute a regulating-governor.

Referring to the accompanying sheet of drawings, Figure 1 is an elevation, partly in section, illustrating the application of my invention. Fig. 2 is a plan corresponding to Fig. 1.

In carrying the invention into effect I obtain from an eccentric, cam, or other mechanical device a reciprocating movement or pull, which reciprocation I compound in any well-known manner with the motion or position of the governor proper. Sometimes I cause a periodic displacement of the governor proper about its then normal position by the reciprocating movement.

An electrical reciprocator may be used instead of a mechanically-actuated device.

In the manner hereinbefore indicated a motion of the required nature may be imparted directly to the admission-valve, or it may be applied to the controlling-valve of a steam, air, or hydraulic relay or to the equivalent part of any relay of a magnetic or other kind.

To work the main admission-valve, I, however, prefer a steam-relay and valve of the simplest construction, which forms part of my invention. Such an arrangement, together with a specific governor suitable for a steam-turbine actuating a dynamo, is constructed and acts as follows: A main admission-valve A, preferably of the double-beat or other balanced type, is connected, by means of a rod B, passing loosely through a bush C, to a piston B' in a closed cylinder. A leakage past this bush C from the steam-chest A' operates the piston B' against a strong spring $B^2$, which spring tends to close the main valve A and cut off the steam supply to the engine. A small outlet-valve D, controlling this cylinder by ports $B^3 B^4$, is operated by the governor. When the said outlet-valve D is closed, the steam admitted to the cylinder by the leak past the bush C raises the piston B' and opens the main valve A; but when the said outlet-valve D is opened the steam escapes from the cylinder faster than it can enter by the leak, and so the spring B closes the main valve.

For intermediate positions of the small outlet-valve D the main supply-valve A assumes corresponding positions of partial opening. Instead of or in conjunction with the loosely-fitting bush I sometimes use an adjustable tap to control the leak, entering under the piston, so as to adjust it to suit various boiler pressures and circumstances. In the drawings, Figs. 1 and 2, the valve D is operated through the lever E by an electrical governor F, and when the operation is as I have just described, the fulcrum E' is fixed. A centrifugal or other governor may operate the lever E instead of an electrical governor.

So far the arrangement constitutes a throttle-governor, but with certain proportions of the parts it may be unstable and cause an intermittent admission. I prefer, however, to insure a cut-off or vibratory action of definite period by mounting the governor-lever E, operating the small outlet-valve D, on a fulcrum E', attached to a rocker or reciprocating lever G, to which is imparted a small periodic reciprocating movement by an eccentric G', actuated from the engine-shaft H by worm-gearing. The rocker-lever G is pivoted from the fixed fulcrum $G^2$, and the said rocker-lever carries the pin E', on which the lever E pivots. When the lever G oscillates, the fulcrum E' is alternately raised and lowered. The lever E then pivots from the pin or pivot $E^3$, where the spring-resistance is applied to oppose the solenoid F'. Although the lever G always gives the same travel to the pivot E', and therefore to the valve D, yet the point of cut-off in the said travel is determined by the position of the solenoid F and the amount of cover of the valve D—that is, in some positions of the lever E the valve D opens or closes with a smaller movement than in other positions. A regulated aperture may be adopted instead of a leak past the bush C.

The governor proper consists of a solenoid F, excited from the main or a subsidiary circuit of the dynamo, and may be simple or compound, as desired.

The core F' of the solenoid F is balanced by an adjustable spring against the magnetic pull. This spring may be applied to the lever E, acting from the hook J or other convenient point. By this means a sensitive governor is obtained in a well-known manner. Any other convenient form of governor, such as a centrifugal governor, may, however, be used for the combination.

The reciprocation of the rocker-lever G causes the small outlet-valve D to reciprocate slightly about the normal position in which the governor tends to place it, and so causes the main valve to be lifted periodically and kept open for longer or shorter times.

When the engine is running at standard speed or electrical output, the main valve A remains open and closed for definite periods, dependent on the position of the lever. In its normal position if the load decreases the position of the lever E alters slightly and the periods of admission are of shorter duration. The reverse takes place when the load increases. As the small valve D of the steam relay actuated by the lever E is balanced, so far as steam-pressure is concerned, the lever E is moved with perfect freedom by the solenoid F. This freedom of movement is very much assisted by the reciprocating movement of all the parts, which neutralizes all frictional resistance.

Any suitable form of admission-valve may be used, with or without relay—that is, the governor may be made powerful enough to operate the said admission-valve direct or by a lever, such as E, and it may be disturbed about its normal position, also, directly by connection to a rocker-lever, as G.

Any suitable means may be adopted to impart the reciprocating movement to the valve A.

Any arrangement of levers, pulleys, pistons, or other devices or pistons with fluid of any kind, or any known device for compounding motions may be employed to superimpose the reciprocating movement between the governor proper and the main valve. Further, any periodic impressed force may be applied to the governor proper itself, with or without any combination of dash-pots or other device for preventing oscillations, to secure the periodic displacement of the governor proper.

It is also to be understood that the sleeve of a centrifugal governor may be periodically displaced for the purposes hereinbefore described.

Having now particularly described and ascertained the nature of my said invention and in what manner the same is to be performed, I declare that what I claim is—

1. The combination of a periodically opening and closing steam control valve, a steam-relay valve, a governor and lever connections, whereby the motions of the relay valve are compounded to cause the constant reciprocation of said relay valve and steam control valve and to vary the position of the relay valve with reference to the steam ports according to variations in the position of the governing mechanism and so determine the proportion of each reciprocation during which steam is admitted to or cut off from the engine, substantially as described.

2. The combination with a steam supply and cut-off valve, as A, and a steam relay valve, as D, of the lever E connected with the relay valve and controlled by a governor, and the lever G actuated from the engine shaft and compounded with the lever E to control the periodic opening and closing of the steam supply and cut-off valve, substantially as described.

In testimony whereof I affix any signature in presence of two witnesses.

CHARLES ALGERNON PARSONS.

In presence of—
 JNO. J. SUTHERLAND,
 ROBERT CRUMP.